(No Model.)
A. & E. L. WYCKOFF.
COMPOSITE TUBING.
No. 441,733. Patented Dec. 2, 1890.
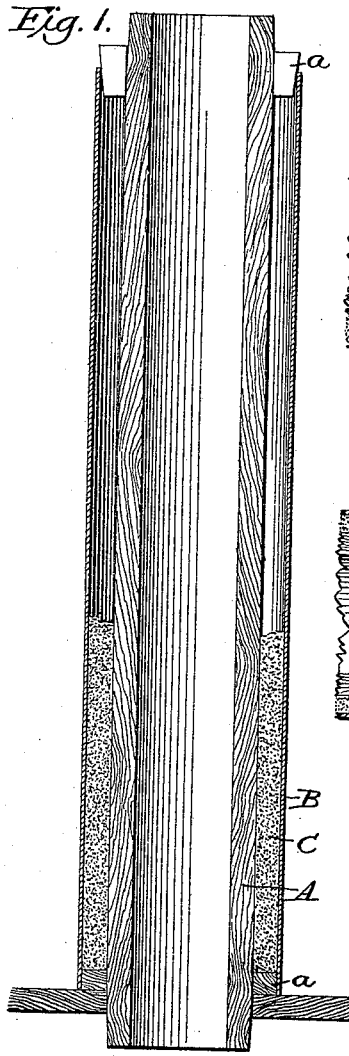
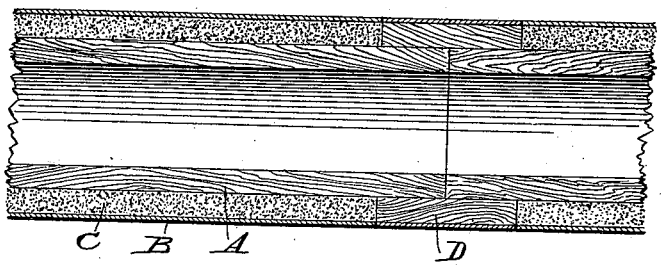
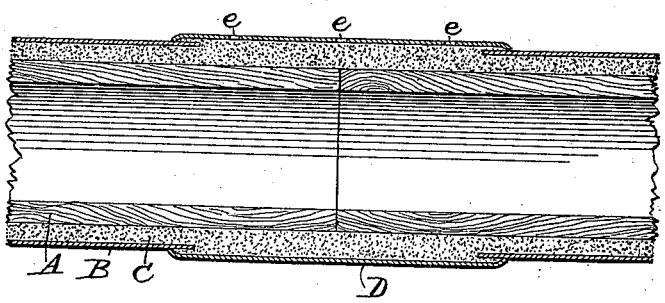
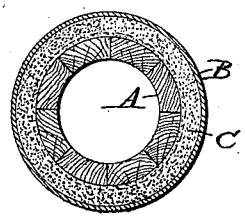
Witnesses:
Horace A. Dodge.
Arthur Ashley.
Inventor:
A. Wyckoff.
E. L. Wyckoff,
by Dodge & Sons,
Attys.

UNITED STATES PATENT OFFICE.

ARCALOUS WYCKOFF AND ERNEST L. WYCKOFF, OF ELMIRA, NEW YORK.

COMPOSITE TUBING.

SPECIFICATION forming part of Letters Patent No. 441,733, dated December 2, 1890.

Application filed July 25, 1890. Serial No. 359,879. (No model.)

*To all whom it may concern:*

Be it known that we, ARCALOUS WYCKOFF and ERNEST L. WYCKOFF, citizens of the United States, residing at Elmira, in the county of Chemung and State of New York, have invented certain new and useful Improvements in Composite Tubing, of which the following is a specification.

This invention relates to wooden pipes or tubing; and the invention consists in a novel construction of the pipe or tubing, as hereinafter more fully described.

Figure 1 is a longitudinal central section of a joint of the pipe, showing the manner of applying the cement. Fig. 2 is a longitudinal section showing one form of sleeve for connecting the sections of pipe, and Fig. 3 is a similar view showing a modification of the sleeve. Fig. 4 is an end view of a section of the pipe.

The object of our present invention is to produce a pipe for use in mines and factories where the fluid to be conveyed contains or is impregnated with acid, brine, or any similar substance that is injurious to metal pipes, and which shall be both strong and durable. To produce such a pipe, we first make a pipe or tube of wood, as indicated by A in the several figures. If the pipe is of relatively small diameter, this wooden tube may be formed by boring and turning a solid piece of wood of the required length for each section. In cases where larger pipes are required the wooden portion A may be made of strips of plank fitted together like staves, as shown in Fig. 4, or in any manner desired. After having provided the wooden tube A we then provide a sheet-iron tube or jacket B, which is made considerably greater in diameter than the wooden tube A, so that when this sheet-iron jacket is placed over the wooden tube a space will be left between the outer surface of the wood and the inner surface of the jacket all around, as shown in Fig. 1. This jacket will preferably be made of galvanized sheet-iron, its edges being secured by lapping and soldering or by rivets, or both, as may be preferred. The annular space between the wooden pipe and the jacket we fill with cement or plaster-of-paris, which is applied in a semi-liquid condition. One of the simplest methods of applying the cement is shown in Fig. 1, and which consists in setting the wooden pipe on end, placing the jacket B around it, and inserting three or more small blocks *a* at the ends to center the pipe A within the jacket, and then pour the cement properly prepared into the space, it being shown partially filled in Fig. 1. The cement or filling should be sufficiently fluid to flow and fill the space completely and of a quality that will soon set and become hard. It is obvious that the filling can be applied, even if not so thin as to flow freely, by using a rammer to compact it, more especially in tubing of a large size; but that would consume more time and would be no better. Hence we prefer the plan described, though any plan that will insure the filling of the space with the cement may be used, as our invention is not limited to any particular manner of applying it. This pipe or tubing we make in sections of any convenient length, and to enable these sections to be readily united, so as to form a line of any desired length, the wooden portion A is made longer than the jacket B, so that it will project at each end beyond the jacket to receive a coupling or sleeve D, as shown in Fig. 2, which represents the ends of two sections united. The sleeve D is made of wood with a sheet-iron jacket fitted on tight without any intervening layer of cement, it being of the proper diameter internally to fit snugly onto the projecting ends of the wooden tube A, these ends being slightly tapered to insure a snug fit when the parts are forced together, or the ends may be a little large and thus make a tight joint.

In Fig. 3 we have shown another form of sleeve which may be used, if preferred, it being specially adapted for use with the larger-sized tubing. In this case the sleeve is made of sheet-iron of a diameter sufficient to enable it to fit over the ends of the jacket B, as shown in Fig. 3, it being provided with a few small holes *e*, as shown, through which the cement can be poured after the sleeve has been placed in position, so as to fill the space completely, the cement of the sleeve uniting with that at the ends of the jacket, thus forming a perfectly-tight joint. Either form of sleeve may be used at will, the wooden sleeve being more especially adapted to the smaller sizes of tubing. Where it is used and put together with taper or tight-fitting joints, as described, the swelling of the wood will render the joints water-tight, the same as in the old-fashioned pump-logs, while if the other form of sleeve be used the cement will render the joint tight, so that in either case a tight line of tubing can be laid of any length desired. Branches of the T or Y form can be made at any point desired, and sections provided with such branches will be provided, so that they can be inserted wherever required in the main line.

This tubing will ordinarily be made at the factory ready for use wherever desired; but in mines or where large pipes are required and the wooden pipe is made up in the stave form the same may be laid up or put together in place. Of course when this form is used hoops or bands will be used to hold the staves together while the jacket and cement are applied, these hoops being embedded in the cement when it is supplied, and thus fully protected, though they, like the jacket, will preferably be made of galvanized metal.

Tubing thus constructed is strong and durable, and is especially adapted for use in iron and copper mines and for conveying brine, cider, vinegar, or any liquid impregnated with substances injurious to metal pipes, or for conveying mineral or other water, as the liquid comes in contact with the wood only in passing through it.

We are aware that composite tubes composed of wood and glass or metal with the intervening space filled with mica or similar fire-proof material have been patented for inclosing electrical conductors, and we make no claim to such; but

Having thus described our invention, what we claim is—

The herein-described tubing, composed of an inner wooden pipe and an exterior sheet-metal jacket, with an intervening layer of cement, substantially as described.

In witness whereof we hereunto set our hands in the presence of two witnesses.

ARCALOUS WYCKOFF.
ERNEST L. WYCKOFF.

Witnesses:
MARCIA G. DERBY,
HENRY SIMPSON.